(12) United States Patent
Fitzsimmons

(10) Patent No.: US 8,073,787 B2
(45) Date of Patent: *Dec. 6, 2011

(54) SYSTEM AND METHOD FOR MAIL VERIFICATION

(76) Inventor: Todd E. Fitzsimmons, Long Beach, CA (US)

( * ) Notice: Subject to any disclaimer, the term of this patent is extended or adjusted under 35 U.S.C. 154(b) by 431 days.

This patent is subject to a terminal disclaimer.

(21) Appl. No.: 12/454,052

(22) Filed: May 11, 2009

(65) Prior Publication Data

US 2009/0287344 A1 Nov. 19, 2009

Related U.S. Application Data

(63) Continuation of application No. 10/271,471, filed on Oct. 15, 2002, now Pat. No. 7,818,268.

(60) Provisional application No. 60/330,031, filed on Oct. 16, 2001.

(51) Int. Cl.
*G06F 17/00* (2006.01)
*G06F 21/00* (2006.01)
*G06Q 10/00* (2006.01)
*G06Q 20/00* (2006.01)
*G07B 17/02* (2006.01)

(52) U.S. Cl. ............ 705/401; 705/1.1; 705/64; 705/402; 705/408; 713/186

(58) Field of Classification Search .................. 705/1.1, 705/64, 401, 402, 408; 713/186
See application file for complete search history.

(56) References Cited

U.S. PATENT DOCUMENTS

| | | |
|---|---|---|
| 4,558,318 A | 12/1985 | Katz et al. |
| 5,043,908 A | 8/1991 | Manduley et al. |
| 5,684,705 A | 11/1997 | Herbert |
| 5,963,927 A | 10/1999 | Herbert |
| 5,984,366 A | 11/1999 | Priddy |
| 6,260,029 B1 | 7/2001 | Critelli |
| 6,289,323 B1 | 9/2001 | Gordon et al. |
| 6,510,992 B2 | 1/2003 | Wells et al. |
| 6,539,360 B1 | 3/2003 | Kadaba |
| 6,810,408 B1 | 10/2004 | Bates et al. |
| 7,200,753 B1 | 4/2007 | Shinzaki et al. |
| 7,305,104 B2 | 12/2007 | Carr et al. |
| 2002/0029152 A1 | 3/2002 | Lee et al. |

(Continued)

FOREIGN PATENT DOCUMENTS

JP 09-099931 4/1997

(Continued)

*Primary Examiner* — Fadey Jabr

(57) ABSTRACT

A system and method is provided for transmitting mail verification data over a wide area network, such as the Internet, in response to receiving and authenticating at least a portion of mail identification (ID) data. In one embodiment of the present invention, a mail verification application is adapted to store at least a verifying portion (e.g., an identifiable code portion, a shipping portion, a recipient portion, etc.) of mail ID data in memory. The mail ID data is then affixed to a mail object. The mail object is then manually delivered to a recipient. At least an authenticating portion of the mail ID data is then provided to a reception device. The reception device, which communicates with the mail ID device over a wide area network, transmits at least the authenticating portion of the mail ID data to the mail verification application operating on the mail ID device. The mail verification application then compares the authenticating portion of the mail ID data with the verifying portion stored in memory. If the authenticating portion of the mail ID data is authenticated, mail verification data is sent to the reception device. In one embodiment of the present invention, at least a portion of the mail verification data includes authenticating data, securing data, sender data, recipient data, mail-content data, downloadable-product data, sender-web-page data, and/or third-party-web-page data.

58 Claims, 3 Drawing Sheets

U.S. PATENT DOCUMENTS

| | | |
|---|---|---|
| 2002/0083022 A1 | 6/2002 | Algazi |
| 2003/0004830 A1 | 1/2003 | Frederick |
| 2003/0101143 A1 | 5/2003 | Montgomery et al. |
| 2003/0101148 A1 | 5/2003 | Montgomery et al. |
| 2003/0102374 A1 | 6/2003 | Wojdyla et al. |
| 2003/0118191 A1 | 6/2003 | Wang et al. |
| 2003/0141358 A1 | 7/2003 | Hudson et al. |
| 2003/0177095 A1 | 9/2003 | Zorab et al. |

FOREIGN PATENT DOCUMENTS

| | | |
|---|---|---|
| JP | 2001275159 | 10/2001 |
| JP | 2002284239 | 10/2002 |
| WO | WO 96/03286 | 2/1996 |
| WO | WO 96/13015 | 5/1996 |
| WO | WO 01/35348 | 5/2001 |

SYSTEM AND METHOD FOR MAIL VERIFICATION

CROSS-REFERENCE TO RELATED APPLICATION

This application is a continuation of U.S. patent application Ser. No. 10/271,471, filed Oct. 15, 2002, now U.S. Pat. No. 7,818,268 which claims the benefit pursuant to 35 U.S.C. §119(e) of U.S. Provisional Patent Application No. 60/330,031 filed Oct. 16, 2001, which applications are specifically incorporated herein, in their entirety, by reference.

BACKGROUND OF THE INVENTION

1. Field of the Invention

The present invention relates to mail verification, and more particularly to a system and method of authenticating at least one mail object by providing at least a portion of mail identification data over a wide area network, such as the Internet, in order to receive mail verification data.

2. Description of Related Art

Currently there are two ways to provided mail objects (e.g., letters, documents, packages, etc.) to an end user; that being electronically (e.g., email, etc.) and through traditional mail services (e.g., U.S. Postal Service, Federal Express, UPS, Courier, etc.). However, because certain mail objects cannot be delivered electronically (either because its impossible or impractical), they are delivered using traditional mail services.

There are several problems with delivering mail objects through traditional mail services. First, the mail object is typically secured inside packaging (e.g., envelops, boxes, etc.) before it is provided to the mail service. Thus, neither the mail service nor the recipient is aware of the contents of the package until such package is opened by the recipient. This creates a problem in that hazardous mail objects (i.e., Anthrax, explosives, etc.) are not detected until they are opened by the recipient, thus exposing the recipient to the hazardous material. It also creates a problem in that mail objects (in general) are not known until they are opened by the recipient, thus making it difficult for the recipient (or his designee) to properly screen, sort or avoid certain mail objects (e.g., offensive mail, annoying mail, etc).

Second, a manually delivered mail object is limited to a one-way production of a finite set of information and/or products. This becomes problematic when the sender of the mail object is interested in providing or receiving additional information (e.g., product instructions, warranty information, etc.). Finally, contents that can be delivered electronically (e.g., advertisements, software, etc.) are often included in mail objects that are delivered via traditional mail services. The drawback with this is that it increases the cost associated with producing and/or delivering the mail object and increase the size of the mail object. For at least these reasons, a need exists in the industry for a system and method of providing mail verification data in response to receiving mail ID data over a wide area network, such as the Internet.

SUMMARY OF THE INVENTION

The present invention provides a system and method for providing mail verification data over a wide area network, such as the Internet, in response to receiving and authenticating at least a portion of mail identification (ID) data. Preferred embodiments of the present invention operate in accordance with at least one reception device, a mail identification (ID) device, a memory, and a mail verification application adapted to communicate with the reception device over a wide area network, such as the Internet. Specifically, the mail verification application is adapted to store at least a verifying portion of mail ID data in memory. In one embodiment of the present invention, the verifying portion of the mail ID data includes an identifiable code portion (e.g., an alpha code, a numeric code, an alphanumeric code, a symbolic code, a digital code, etc.), a shipping portion (e.g., ship date, shipping location, shipping method, etc.) and/or a recipient portion (e.g., the recipients name, address, email address, IP address, account number, social security number, etc.). The mail ID data is then affixed to a mail object. The mail object, which may further include a mail-to-address, a return-mail-address, and/or postage, is then manually delivered to a recipient. In one embodiment of the present invention, the mail ID data further includes mail-to-address data, return-mail-address data, and/or postage data.

At least an authenticating portion of the mail ID data is then provided to the reception device. The reception device, which communicates with the mail ID device over a wide area network, transmits at least the authenticating portion of the mail ID data to the mail verification application operating on the mail ID device. The mail verification application then compares the authenticating portion of the mail ID data with the verifying portion stored in memory. If the authenticating portion corresponds to the verifying portion (e.g., matches, is reasonably related, etc.), then mail verification data is sent to the reception device. In one embodiment of the present invention, at least a portion of the mail verification data includes authenticating data (indicating that the mail ID data has been authenticated), securing data (indicating who secured the mail object), sender data (indicating who sent the mail object), recipient data (indicating the intended recipient of the mail object) and/or additional data (e.g., the contents of the mail object, downloadable product data, sender web-page information, third party advertisements, etc).

In one embodiment of the present invention, the mail ID device further includes an input device adapted to provide at least a verifying portion of the mail ID data to the mail verification application and/or an output device adapted to affix the mail ID data on the mail object. In another embodiment of the present invention, the reception device includes an input device for receiving at least an authenticating portion of the mail ID data from the mail object and/or a mail authenticating application adapted to receive at least the authenticating portion of the mail ID data from the input device and provide at least the authenticating portion of the mail ID data to the mail ID device. In another embodiment of the present invention, the U.S. Postal Service (or an interim authenticating or screening entity) is the recipient of the mail object, thus interacting with the reception device to receive mail verification data.

A more complete understanding of the system and method for providing mail verification data in response to receiving at least a portion of mail ID data will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention provides a system and method for providing mail verification data over a wide area network, such as the Internet, in response to receiving and authenticating at least a portion of mail identification (ID) data. In the detailed description that follows, like element numerals are used to describe like elements illustrated in one or more figures.

Figure 1:
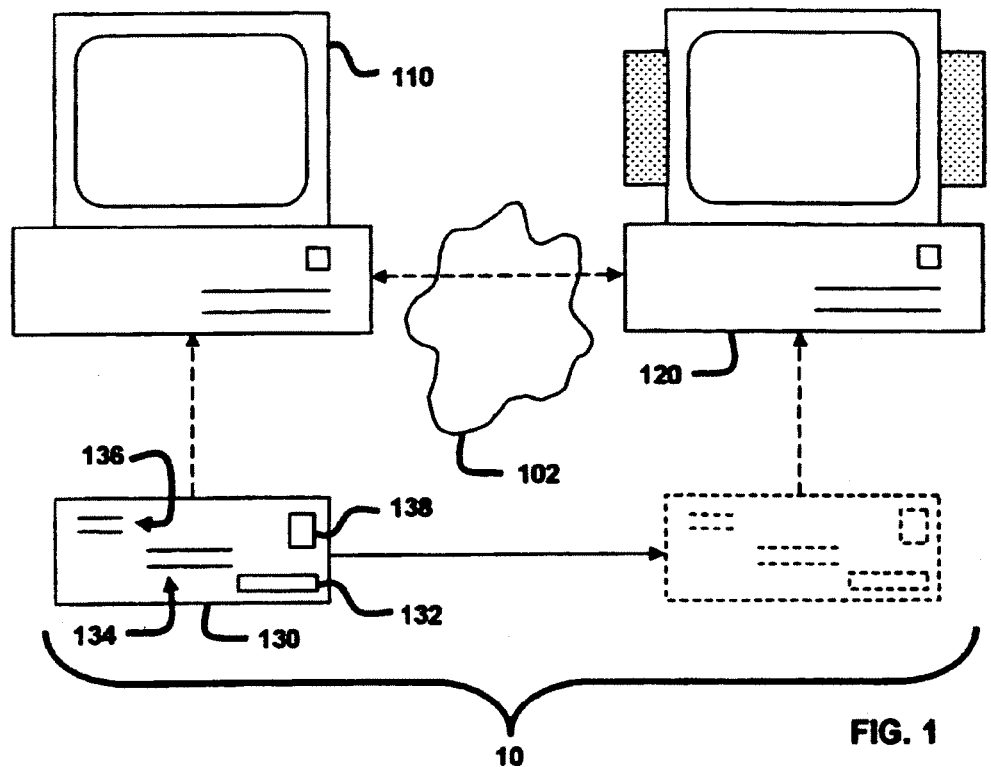
FIG. 1 illustrates one embodiment of the mail verification system.
Figure 2:
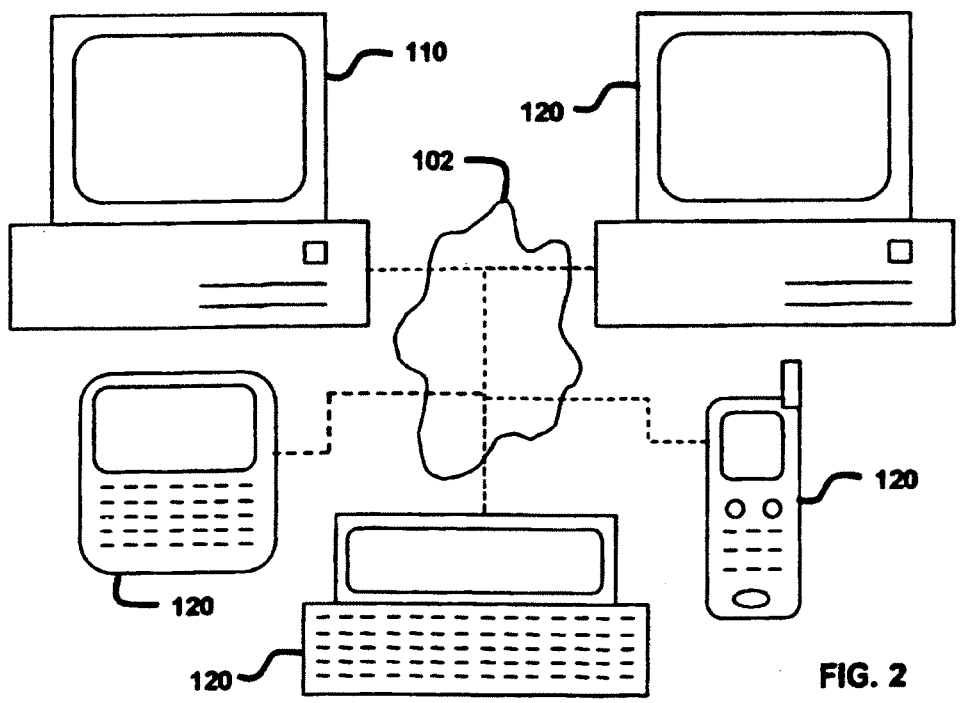
FIG. 2 illustrates a mail ID device communicating with a plurality of reception devices over a wide area network, such as the Internet.

Preferred embodiments of the present invention operate in accordance with at least one reception device, a mail identification (ID) device, a memory, and a mail verification application adapted to communicate with the reception device over a wide area network, such as the Internet. FIG. 1 illustrates one embodiment of the mail verification system 10, which includes a mail ID device 110 and a reception device 120 communicating through a wide area network 102, such as the Internet. It should be appreciate, as depicted in FIG. 2, that the reception device(s) 120 includes, but is not limited to, personal computers, set top boxes, personal digital assistances (PDAs), mobile phones, land-line phones, televisions, bar code readers, and all other physically and wirelessly connected reception devices generally known to those skilled in the art. It should further be appreciated that the number of reception devices 120 depicted in FIGS. 1 and 2 are merely to illustrate how the present invention operates, and are not intended to further limit the present invention.

Figure 3:
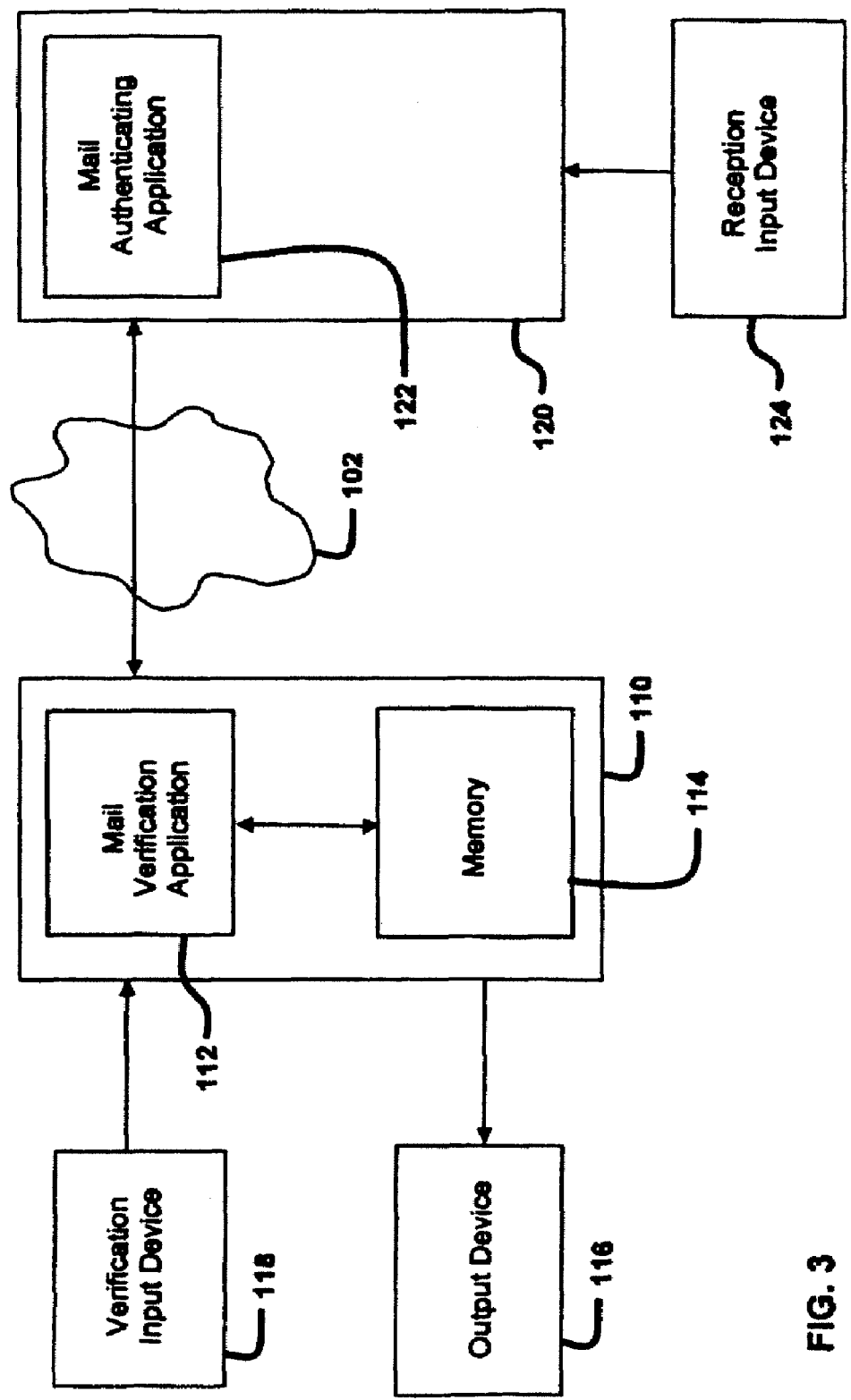
FIG. 3 illustrates one embodiment of the mail ID device and the reception device depicted in FIG. 1.

As shown in FIG. 3, the mail ID device 110 further includes a mail verification application 112 and a memory 114. The mail verification application 112 is adapted to store at least a portion (i.e., a verifying portion) of mail ID data in the memory 114, receive at least a portion (i.e., an authenticating portion) of mail ID data from the reception device 120, and provide mail verification data if the portion of the mail ID data received from the reception device 120 is authenticated. It should be appreciated that the mail verification application 112 may further be adapted to generate the mail ID data and provide it to an external device (e.g., a printer, etc.) or receive at least a verifying portion of the mail ID data from an external device (e.g., a scanner, etc.). It should also be appreciated that the mail verification application 112 may exist as a single application, or as multiple applications (locally and/or remotely stored) that operate together to perform the verification functions as described herein. It should further be appreciated that the location of the memory device 114 depicted in FIG. 3 is not intended to further limit the present invention. Thus, a memory device that is, for example, external to the mail ID device 110 is within the spirit and scope of the present invention.

Referring back to FIG. 1, where the dashed arrows indicate data transactions and the solid arrow indicates physical movement, mail ID data 132 is affixed to a mail object 130 (as used in its broader sense to encompass the packaging that surrounds the content). It should be appreciated that mail ID data can be encoded/encrypted (e.g., using bar code data, digital data, etc.) to prevent fraudulent usage. It should further be appreciated that affixing the mail ID data 132 on the mail object 130 includes, but is not limited to, printing or attaching mail ID data directly on the outer surface of the mail object 130 or printing/storing the mail ID data 132 on labels, ICs, smart cards, RFID tags, or any other data storage devices (or materials) generally known to those skilled in the art, and attaching them to the outer surface of the mail object 130. It should also be appreciated that the location of the mail ID data 132 on the mail object 130 in FIG. 1 is merely to exemplify how the invention operates, and is not intended to further limit the present invention. Thus, affixing the mail ID data 132 in some other location, such as over the sealing flap of an envelope, is within the spirit and scope of this invention.

At least a portion (i.e., a verifying portion) of the mail ID data 132 (either before or after the mail ID data is affixed) is stored in the mail ID device 110, or more particular (as shown in FIG. 3) in a memory 114 located within the mail ID device 110. Specifically, the mail verification application 112 either receives or generates at least the verifying portion of the mail ID data 132. The verifying portion is then stored in the memory 114. In one embodiment of the present invention, the verifying portion of the mail ID data includes a identifiable code portion (e.g., an alpha code, a numeric code, and alphanumeric code, a symbolic code, a digital code, etc.), a shipping portion (e.g., ship date, shipping location, shipping method, etc.), and/or a recipient portion (e.g., the recipients name, address, email address, IP address, account number, social security number, etc.). The mail object 130, which may further include a mail-to-address 134, a return-mail-address 136, and/or postage 138, can then be manually delivered to a recipient. It should be appreciated that the mail ID data 132 can also be encoded (e.g., in a bar code, etc.) to include mail-to-address data, return-mail-address data, and/or postage data. In other words, for example, mail ID data could be encoded to include both coded data and postage-account data.

Once the recipient (or their designee) receives the mail object 130, at least an authenticating portion of the mail ID data 132 is provided to the reception device 120. The reception device 120, which communicates with the mail ID device 110 over a wide area network 102, transmits at least the authenticating portion of the mail identification data to the mail verification application 112 operating on the mail ID device 110. The mail verification application 112 then compares the authenticating portion of the mail ID data with the verifying portion stored in memory 114. If the received portion is authenticated, or corresponds to the verifying portion (e.g., matches, is reasonably related, etc.), then mail verification data is sent to the reception device 120.

In one embodiment of the present invention, at least a portion of the mail verification data includes authenticating data (e.g., image data, audio data, etc.) indicating that the mail ID data has been authenticated. This would allow, for example, the reception device 120 to produce at least one authenticating image on a display and/or perform at least one authenticating sound on a speaker. In another embodiment of the present invention at least a portion of the mail verification data includes securing data (indicating who secured the mail object), sender data (indicating who sent the mail object), recipient data (indicating who is to receive the mail object) and/or additional data (e.g., the contents of the mail object, downloadable product data, sender web-page data, third party advertisements, etc).

In another embodiment of the present invention, the mail ID device and/or the reception device further include an input device (e.g., 118, 124) adapted to receive at least a portion of the mail ID data. It should be appreciated that that the input devices depicted and discussed herein (e.g., 118, 124) include, but are not limited to, scanners (e.g., bar code scanners, etc.), keyboards, RFID readers, smart card readers, IC readers, and all other input devices generally known to those skilled in the art.

In another embodiment of the present invention, the mail ID device further includes an output device 116 adapted to affix (e.g., print, store, etc.) the mail ID data on the mail object. It should be appreciated that affixing the mail ID data on the mail object includes, but is not limited to, printing or attaching mail ID data directly on the outer surface of the mail object or printing/storing the mail ID data on labels, ICs, smart cards, RFID tags, or any other data storage devices (or materials) generally known to those skilled in the art, and attaching them to the outer surface of the mail object. It should further be appreciated that the output device depicted and described herein (e.g., 116) includes, but is not limited to, printers, data storage device (e.g., device capable of storing data on ICs, smart cards, RFID tags, etc.), and all other output devices generally known to those skilled in the art.

In another embodiment of the present invention, as shown in FIG. 3, the reception device 120 further includes a mail authenticating application 122 adapted to receive at least the authenticating portion of the mail ID data from the input device 124 and provide at least the authenticating portion of the mail ID data to the mail ID device. It should be appreciated that the mail authenticating application 122 may exist as a single application, or as multiple applications (locally and/or remotely stored) that operate together to perform the authenticating functions as described herein.

In one embodiment of the present invention, the mail ID data further includes software-booting data adapted to boot the mail authenticating application, an email application and/or a browser application. Either one of these applications could then be used to provide at least an authenticating portion of said mail ID data to said mail ID device, provide additional information to said mail ID device (or the sender of the mail object), and/or receive additional information from either the mail ID device, the sender of the mail object, or a third-party. In another embodiment, the mail verification data further includes software-booting data adapted to boot an email application and/or a browser application. Either one of these applications could then be used to provide additional information to the mail ID device and/or receive additional information from either the mail ID device, the sender of the mail object, or a third party.

In another embodiment of the invention, the reception device 120, or more particularly the mail authenticating application 122 is adapted to provide a reply email to the mail ID device 130 or the sender of the mail object. This reply email may either be sent automatically, to acknowledge the reception of the mail ID data and/or mail verification data, or manually, to allow the recipient to communicate with the mail ID device and/or sender of the mail object. In another embodiment of the invention the mail verification application 112 is adapted to provide the mail verification data to the reception device 120 via an email.

In another embodiment of the present invention, the U.S. Postal Service (or an interim authenticating or screening entity) is the recipient (as defined by this application) of the mail object 130, thus interacting with the reception device 120 to receive mail verification data. If mail is authenticated (or approved in the case of screening), the mail object 130 is forwarded on to the actual intended recipient.

Figure 4:
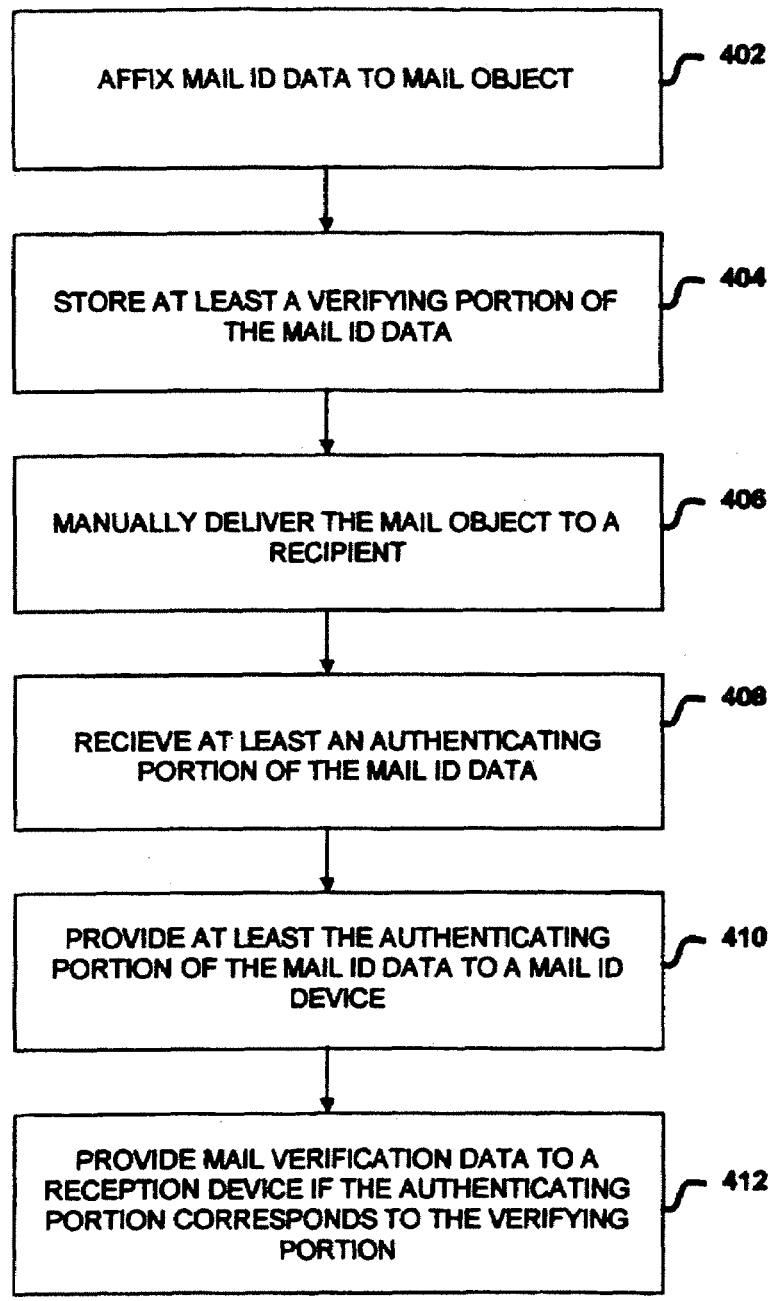
FIG. 4 is a flow chart illustrating one method of providing mail verification data in response to receiving at least a portion of mail ID data.

FIG. 4 is a flow chart illustrating one method of providing mail verification data in response to receiving at least a portion of the mail ID data. Specifically, in step 402 mail ID data is affixed to a mail object. At step 404, a verifying portion of the mail ID data is stored in a memory device. The mail object is then delivered to its recipient (or designee) at step 406. At step 408, a reception device receives at least an authenticating portion of the mail ID data. The reception device then provides at least the authenticating portion to a mail ID device at step 410. If the authenticating portion of the mail ID data corresponds to the verifying portion of the mail ID data, then mail verification data is provided to the reception device at step 412. It should be appreciated that storing the verifying portion of the mail ID data before the mail ID data is affixed to the mail object is within the spirit and scope of the present invention.

Having thus described multiple embodiments of a system and method of providing mail verification data in response to receiving mail ID data, it should be apparent to those skilled in the art that certain advantages of the system have been achieved. It should also be appreciated that various modifications, adaptations, and alternative embodiments thereof may be made within the scope and spirit of the present invention. The invention is further defined by the following claims.

What is claimed is:

1. A system for authenticating a mail object, said mail object being provided to a mail carrier and including mail identification data affixed on said mail object in a single barcode, comprising:
   a first computer configured to communicate at least a first portion of said mail identification data over a network, said mail identification data including a shipping portion, a recipient portion, a sender portion, and an identifier portion, wherein said shipping portion includes shipping method data, said recipient portion includes an address of a recipient of said mail object, and said identifier portion includes a unique identifier that consists of a numeric value assigned by a sender of said mail object;
   a database; and
   a second computer comprising a verification application, said second computer being configured to receive at least said first portion of said mail identification data from said first computer via said network, said first portion of said mail identification data consisting of said shipping portion, said sender portion and said identifier portion;
   wherein said verification application is in communication with said database and configured to authenticate said first portion of said mail identification data by determining whether said first portion of said mail identification data is stored in said database and providing verifying data to said first computer via said network, said verifying data indicating whether said first portion of said mail identification data is stored in said database, wherein at least a portion of said first portion can be used by said mail carrier to identify said sender of said mail object.

2. The system of claim 1, wherein said first computer is further configured to generate said unique identifier.

3. The system of claim 1, wherein said first computer further comprises an output device for affixing said barcode onto said mail object.

4. The system of claim 3, wherein said first computer is further configured to encode said mail identification data into said barcode prior to said barcode being affixed to said mail object.

5. The system of claim 4, wherein said first computer is further configured to encrypt said mail identification data before it is encoded into said barcode.

6. The system of claim 1, wherein said sender portion includes data that is assigned by said mail carrier and can be used by said mail carrier to identify said sender of said mail object.

7. The system of claim 6, wherein said verifying data further includes postage data pertaining to said mail object.

8. The system of claim 7, wherein said verification application is further configured to determine whether said first portion of said mail identification data is stored in said database and to provide said verifying data to said first computer before said mail object is accepted by said mail carrier.

9. The system of claim 6, wherein said first computer is further configured to communicate said first portion of said mail identification data to said second computer before said mail object is provided to said mail carrier.

10. The system of claim 1, wherein said verifying data further includes postage data pertaining to said mail object.

11. The system of claim 10, wherein said verification application is further configured to generate an email concerning said verifying data and provide said email to said first computer.

12. The system of claim 1, wherein said verification application is further configured to determine whether said first portion of said mail identification data is stored in said database and to provide said verifying data to said first computer before said mail object is accepted by said mail carrier.

13. The system of claim 1, wherein said first computer is further configured to communicate second mail identification data to said second computer, said second mail identification data being affixed in a single barcode to a second mail object provided to said mail carrier, wherein said second mail identification data includes sender data and a second unique identifier assigned by said sender, and said verification application is further configured to determine whether said second mail identification data is stored in said database, wherein said verifying data further indicates whether said second mail identification data is stored in said database.

14. The system of claim 13, wherein said verifying data further includes content data pertaining to said second mail object.

15. The system of claim 13, wherein said verifying data further includes postage data pertaining to said second mail object.

16. The system of claim 14, wherein said second mail identification data further includes destination data and shipping method data.

17. A method for authenticating a mail object, said mail object including mail identification data affixed on said mail object as a single barcode, comprising:
communicating by at least one computer at least a first portion of said mail identification data over a network, said mail identification data includes a shipping portion, a recipient portion, a sender portion, and an identifier portion, wherein said shipping portion includes shipping method data, said recipient portion includes destination data of said mail object, and said identifier portion consists of a numeric value assigned by a sender of said mail object; and
receiving by a second computer at least said first portion of said mail identification data, said first portion of said mail identification data consisting of said shipping portion, said sender portion and said identifier portion;
determining by said second computer whether said first portion of said mail identification data is stored in a database in communication with said second computer; and
generating at least one electronic file in response to said step of determining whether said first portion is stored on said database, said at least one electronic file comprising verification data and postage data, said verification data providing whether said first portion of said mail identification data is stored in said database;
wherein said at least one electronic file is accessible to said at least one computer and at least a portion of said first portion of said mail identification data can be used by a mail carrier to identify said sender.

18. The method of claim 17, further comprising:
encoding said mail identification data in said single barcode;
affixing by an output device said single barcode on said mail object; and
providing said mail object to said mail carrier.

19. The method of claim 18, further comprising using an algorithm to digitally code said mail identification data prior to encoding said mail identification data in said single barcode.

20. The method of claim 18, wherein said sender portion includes sender data that is assigned by said mail carrier, wherein said sender data can be used by said mail carrier to identify said sender of said mail object.

21. The method of claim 20, wherein said steps of determining whether said first portion of said mail identification data is stored in said database and generating said at least one electronic file are performed before said mail object is accepted by said mail carrier.

22. The method of claim 20, further comprising:
communicating by said at least one computer second mail identification data to said second computer, said second mail identification data being affixed as a single barcode on a second object provided to said mail carrier and including at least said sender data and an identifier assigned by said sender;
determining by said second computer whether said second mail identification data is stored in said database, wherein said verification data further provides whether said second mail identification data is stored in said database.

23. The method of claim 22, wherein said verification data further includes content data pertaining to said second object.

24. The method of claim 23, further comprising scanning said single barcode on said second object to acquire said second mail identification data, determining whether said second mail identification data is stored in said database, and providing data to said at least one computer if said second mail identification data is stored in said database, said data indicating that said second object has been received by said mail carrier.

25. The method of claim 22, further comprising scanning said single barcode on said second object to acquire said second mail identification data, determining whether said second mail identification data is stored in said database, and providing content data pertaining to said second object over said network if said second mail identification data is stored in said database.

26. The method of claim 18, further comprising providing said at least one electronic file to said at least one computer via said network, wherein said steps of determining whether said first portion of said mail identification data is stored in said database and providing said verifying data to said at least one computer are performed before said mail object is accepted by said mail carrier.

27. The method of claim 18, wherein said step of communicating at least said first portion of said mail identification data over said network is performed before said step of providing said mail object to said mail carrier.

28. The method of claim 17, wherein said postage data pertains to at least said mail object.

29. The method of claim 17, further comprising generating an email concerning said verifying data, and addressing said email to said sender of said mail object.

30. A method for authenticating a mail object that includes mail identification data, said mail identification data being encoded into a single barcode, which is then affixed onto said mail object, comprising:
communicating by at least one sender computer at least a first portion of said mail identification data over a network, said mail identification data including a shipping portion including at least shipping method data, a recipient portion including destination data for said mail object, a sender portion, and an identifier portion including at least a numeric value assigned by a sender of said mail object, and said first portion of said mail identification data consisting of said shipping portion, said sender portion and said identifier portion;
receiving by said at least one sender computer verifying data from a second computer via a network, wherein said verifying data verifies the authenticity of said first portion of said mail identification data by stating whether said first portion corresponds to data that is stored on a database in communication with said second computer;
providing said mail object to a mail carrier, wherein at least a portion of said first portion can be used by said mail carrier to identify said sender of said mail object.

31. The method of claim 30, further comprising using an algorithm to encrypt said mail identification data prior to encoding said mail identification date in a single barcode.

32. The method of claim 30, wherein said sender portion includes data that is assigned by said mail carrier and can be used to identify a sender of said mail object.

33. The method of claim 30, wherein said step of communicating at least said first portion of said mail identification data over said network is performed before said step of providing said mail object to said mail carrier, and said verifying data states whether said first portion of said mail identification data, as communicated by said at least one sender computer, corresponds to data that is stored on said database.

34. The method of claim 30, wherein said step of receiving verifying data is performed before said mail object is routed by said mail carrier through a mail stream to a recipient of said mail object.

35. The method of claim 30, further comprising:
communicating by said at least one sender computer second mail identification data to said second computer, said second mail identification data being affixed as a single barcode on a second object provided to said mail carrier and including at least sender data and an identifier assigned by said sender;
wherein said verifying data further states whether said second mail identification data corresponds to data that is stored in said database.

36. The method of claim 35, wherein said verifying data further includes data on a content of said second object.

37. The method of claim 35, wherein said verifying data further includes postage data pertaining to said second object.

38. The method of claim 36, wherein said verifying data further includes postage data pertaining to said second object.

39. The method of claim 36, further comprising:
scanning said single barcode on said second object to retrieve said second mail identification data;
providing data to said at least one sender computer if said second mail identification data is stored in said database, said data indicating that said second object has been received by said mail carrier.

40. The method of claim 35, further comprising:
scanning said single barcode on said second object to retrieve said second mail identification data;
providing to said at least one sender computer data on a content of said second object if said second mail identification data corresponds to data that is stored on said database.

41. A method for providing electronic data concerning a mail object having mail identification data encoded into a single barcode and affixed to said mail object, comprising:
receiving by at least a first computer at least a first portion of said mail identification data from said mail object, said mail identification data including a shipping portion including at least shipping method data, a recipient portion including destination data for said mail object, a sender portion, and an identifier portion comprising a numeric value, and said first portion of said mail identification data consisting of said shipping portion, said sender portion, and said identifier portion;
determining by said at least said first computer whether said first portion of said mail identification data is stored in a database in communication with said at least said first computer;
providing by said at least said first computer said electronic data to at least a second computer via a network, wherein said electronic data is generated when said first portion of said mail identification data matches data that is stored in said database.

42. The method of claim 41, further comprising the step of providing by said at least said second computer at least a portion of said electronic data to a third computer via said network.

43. The method of claim 42, wherein said step of providing by said at least said second computer at least a portion of said electronic data to a third computer further comprises providing said at least a portion of said electronic data to said third computer via an email.

44. The method of claim 42, wherein said step of providing by said at least said second computer at least a portion of said electronic data to a third computer further comprises providing said at least a portion of said electronic data to said third computer via a web page.

45. The method of claim 44, further comprising the step of generating by said at least said second computer said numeric value.

46. The method of claim 44, further comprising the step of providing by said at least said second computer an email concerning said mail object to said third computer via said network.

47. The method of claim 46, wherein said email is provided automatically in response to the reception of the mail object by the United States Postal Service.

48. The method of claim 42, further comprising the step of providing by said at least said second computer additional information concerning said mail object to said third computer via said network, said additional information being at least one of information on a recipient of said mail object, information on a sender of said mail object, and postage information on at least said mail object.

49. The method of claim 48, wherein said additional information further indicates whether said mail object has been received by the United States Postal Service.

50. A system for providing electronic data concerning a mail object having mail identification data encoded into a single barcode and affixed to said mail object, comprising:
- a scanner configured to scan at least a first portion of said mail identification data from said mail object, said mail identification data including a shipping portion including at least shipping method data, a recipient portion including destination data for said mail object, a mailer portion, and an identifier portion comprising a numeric value assigned by a mailer of said mail object, and said first portion of said mail identification data consisting of said shipping portion, said mailer portion, and said identifier portion;
- a database for storing data on said mail object;
- at least a first computer in communication with said scanner and said database; and
- at least one application running on said at least said first computer and configured to (i) receive at least a first portion of said mail identification data from said scanner, (ii) determine whether said first portion of said mail identification data is stored in said database, and (iii) provide said electronic data to at least a second computer via a network, wherein said electronic data is generated when said first portion of said mail identification data matches said data that is stored in said database.

51. The method of claim 50, further comprising at least said second computer having at least one other application configured to provide at least a portion of said electronic data to a third computer via said network and via at least one of an email and a web page.

52. The system of claim 51, wherein said at least one other application is further configured to generate said numeric value.

53. The system of claim 51, wherein said at least one other application is further configured to provide an email concerning said mail object to said third computer via said network.

54. The system of claim 51, wherein said at least one other application is further configured to provide additional information concerning said mail object to said third computer via said network, said additional information being at least one of information on a recipient of said mail object, information on a sender of said mail object, and information on postage of at least said mail object.

55. The system of claim 53, wherein said email is provided automatically in response to said mail object being received by a recipient of said mail object.

56. The system of claim 53, wherein said email is provided automatically in response to said mail object being received by the United States Postal Service.

57. The system of claim 54, wherein said additional information further indicates whether said mail object has been received by a recipient of said mail object.

58. The system of claim 54, wherein said additional information indicates whether said mail object has been received by the United States Postal Service.

* * * * *

UNITED STATES PATENT AND TRADEMARK OFFICE
CERTIFICATE OF CORRECTION

| | | |
|---|---|---|
| PATENT NO. | : 8,073,787 B2 | |
| APPLICATION NO. | : 12/454052 | |
| DATED | : December 6, 2011 | |
| INVENTOR(S) | : Todd E. Fitzsimmons | |

It is certified that error appears in the above-identified patent and that said Letters Patent is hereby corrected as shown below:

Column 9, line 38, "date" should be changed to --data--;
Column 11, line 23, "a" should be changed to --said--;
Column 12, line 1, "method" should be changed to --system--.

Signed and Sealed this
Tenth Day of January, 2012

David J. Kappos
*Director of the United States Patent and Trademark Office*